United States Patent [19]
Hong

[11] Patent Number: 5,820,333
[45] Date of Patent: Oct. 13, 1998

[54] TWIN GRIPPING APPARATUS FOR LOADING COMPONENT

[75] Inventor: Sung-Ho Hong, Yong'In-Kun, Rep. of Korea

[73] Assignee: Kia Motors Corporation, Seoul, Rep. of Korea

[21] Appl. No.: 606,905

[22] Filed: Feb. 26, 1996

[30] Foreign Application Priority Data

Sep. 25, 1995 [KR] Rep. of Korea .................. 1995/31646

[51] Int. Cl.⁶ .................................................. B23Q 3/157
[52] U.S. Cl. ............................ 414/740; 414/738; 901/37
[58] Field of Search ................................ 414/738, 744.8, 414/783, 739, 740; 901/49, 36, 37, 39

[56] References Cited

U.S. PATENT DOCUMENTS

| 3,771,825 | 11/1973 | Yamada et al. ........................... 901/39 |
| 3,881,761 | 5/1975 | Meyer et al. .............................. 901/36 |
| 4,318,665 | 3/1982 | Carroll et al. ............................ 414/736 |
| 4,565,400 | 1/1986 | Nakashima et al. ..................... 414/736 |
| 5,142,766 | 9/1992 | Wehrmeister ........................... 414/736 |
| 5,620,406 | 4/1997 | Bae ........................................ 414/736 |

*Primary Examiner*—Karen M. Young
*Assistant Examiner*—Gregory A. Morse

[57] ABSTRACT

This invention discloses a twin gripping apparatus for loading components comprising of two grippers, each composed of two pairs of fingers, disposed at an angle of predetermined value so that the components are held and carried to and from a work station. The two pairs of fingers perform simultaneously a carrying motion to and from a work station by gripping the components positioned at each work station by means of hydraulic pressure from air cylinders, and rotating to and from an angle of predetermined value.

13 Claims, 7 Drawing Sheets

TWIN GRIPPING APPARATUS FOR LOADING COMPONENT

BACKGROUND OF THE INVENTION

(1) Field of the Invention

The present invention relates to a twin gripping apparatus for loading components to their load positions by means of two grippers that are each composed by two pairs of fingers so that the components are held and carried to and from a work station.

(2) DESCRIPTION OF THE RELATED ART

Multiple components are commonly used in manufacturing different types of device, such as an automobile. Each component of the automobile is successively assembled together by a series of processes. Accordingly, a shifting system where each part is shifted to each work station is provided in an automobile assembly line.

This kind of shifting system is divided into two types of sub-systems. One type is a typical conveyer belt system located on the bottom of the assembly line for laying and shifting the components on a conveyer belt. Another type is is located on the ceiling of the assembly line for shifting each component, one by one, by means of a gripper.

A gripper carries a cylindrically shaped component, for instance, a cam shaft, from one work station by means of hydraulic pressure from an air cylinder and shifts the component to another work station by a shifting apparatus located on a ceiling of the assembly line.

Among the types of grippers used, there exists a twin gripping apparatus comprised of two grippers. Each gripper performs a separate function to carry the components to and from a work station. That is, one gripper carries an unfinished component and the other gripper simultaneously carries a finished component machined at the previous work station and positions it on the next work station. In this state, each gripper carries the manufactured components by a rotating apparatus, by being rotated at an angle of predetermined value, from one work station, and carries the unfinished component to another work station, resulting in a processing-stand-by status.

Accordingly, each gripper includes a pair of fingers that grip the components made the closing or releasing by action of hydraulic pressure from the air cylinders. The twin gripping apparatus is also equipped with a rotating apparatus that rotates the entire apparatus to position the pair of fingers to hold and carry the component. This kind of rotating apparatus usually is operated with a motor and a reduction gear. It can be also operated by a rack & pinion structure powered by hydraulic pressure.

In the prior art, however, the twin gripping apparatus is made of heavy steel to support the gripping operation, and therefore, an air expensive (in terms of cost and maintenance) cylinder of high capacity is needed to drive the apparatus.

In addition, the air cylinder of high capacity takes up a great amount of space in proportion to its capacity. Providing an adequate amount of space can be an additional problem.

In the conventional twin gripping apparatus, because the gripper and the air cylinder are vertically composed along the same line, the length of the entire twin gripping apparatus is long. Therefore, the lower ends of the fingers are located in a very low position. When each component is loaded and carried in this state, there exists a risk that the component may be broken by running into other equipment. Workers also risk injury by possibly running into the component itself.

Furthermore, during the loading process of the component, if the air cylinder supplying the gripping power to the gripper suddenly goes out of order, there is a loss of hydraulic pressure. When this loss of pressure occurs, the fingers automatically return to their original position, namely an open state, and the held component is therefore released. As a result, there exists possible injury to workers and damage to valuable equipment below, not to mention the damage to the component itself.

The method for using a motor and a reduction gear as a power transmission method for rotating the gripping apparatus requires many additional auxiliary apparatus such as a bearing housing for supporting the rotating motion. The result is a more complicated structure and a greater opportunity and frequency for malfunction. Naturally, it means more time and expense incurred in the repairing process.

In the rack & pinion type or a link type rotating apparatus powered by hydraulic pressure, the piston for driving the rack is formed in one body with the rack, resulting in a heavy weight. Accordingly, to operate the rack and pinion, an air cylinder of high capacity is needed to provide an adequately high hydraulic pressure.

In addition, in the rack & pinion type rotating apparatus, a back-lash phenomenon occurs where the rack is pushed away from the pinion during rotation. Therefore, after a period of time, the rack and the pinion are no longer correctly geared. As a result of this phenomenon, the gripper do not rotate at the correct angle, and the fingers of the gripper cannot correctly grasp or hold the component.

Moreover, in the prior art, the electric wire for driving several equipment as well as the air cylinder is exposed to the outside. Therefore the conventional twin gripping apparatus is unsightly. In addition, in the rotating operation of the twin gripper, the wire can tangle and result in disconnection.

SUMMARY OF THE INVENTION

An object of the invention is to solve the problems of the prior art and provide a twin gripping apparatus for loading components with a sufficient gripping force, without the need to use an air cylinder of high capacity.

A second object of the invention is to provide a twin gripping apparatus for loading components, whose fingers are capable of gripping the components tightly without automatically releasing them due to a loss of hydraulic pressure resulting from malfunction of the gripper, and thereby prevent damage to the component and equipment, and injury to the workers.

A third object of the invention is to provide a twin gripping apparatus having a gripper with a reduced vertical length to enable the components to be shifted to a higher position, so that the components gripped and shifted by the gripper are prevented from colliding with other apparatus or workers.

A fourth object of the invention is to provide a twin gripping apparatus having a rotating apparatus formed with a rack & pinion of reduced weight and suppression of the back-lash phenomenon, thereby allowing the twin gripping apparatus to rotate at an accurate angle.

A fifth object is to provide a twin gripping apparatus whose electric wiring is built-in to provide a better appearance, and prevent the wires from being tangled and disconnected while the twin gripper rotates.

The invention in accordance with the above-mentioned objects comprises a rotating body and two gripping air cylinders mounted the rotating body. A gripper composed of two pairs of fingers is connected to the rod of each gripping air cylinder to grip the components by operating the gripping air cylinder. A spring mounted between the back end of the air cylinder and the rotating body elastically supports to the back end of the air cylinder in a gripping direction of the finger. A connector couples the pairs of fingers to the air cylinder for relative reciprocal motion during closing and opening. A rotating apparatus rotates the rotating body to an angle of predetermined value in a forward and backward motion. In addition, the gripping direction of the fingers is the direction to which the spring is pressed.

Furthermore, the gripping air cylinders are formed at an angle of 90° or a 180° to each other.

A plurality of springs is also equipped to radiate around the back end of the air cylinder.

Moreover, the air cylinder is equipped perpendicular to the line connecting the center of the rotating body and the gripper.

Additionally, a central hole is formed, through which a wire passes, on the center of the rotating body.

The connector of the twin gripping apparatus comprises a shifting link connected to the gripping air cylinder; a first link having one side connected with a pivot to the end of the shifting link and a center part hinged on the rotating body; a second link having one side connected with a pivot to the center part of the first link and a center part hinged on the rotating body; and a connection link fixed on the lower ends of the first and second links respectively, horizontally extended with the fingers fixed on both ends.

The rotating body comprises a restricting end attached to the upper part of the fingers and a proximity switch for controlling the operation of the fingers that are connected to the restricting end and attached to the rotating body.

The rotating apparatus comprises a main body frame; two rotating air cylinders that are arrayed against each other around the center line of the main body frame; a piston that executes a reciprocating motion with the hydraulic pressure transferred from the rotating air cylinder; a rack that executes a round motion and is connected to the piston; a pinion that is coupled to the rack and has a rotating body; a rotating piece that is fixed to and rotates with the pinion; and two stoppers that are attached to the rotating piece at an angle of predetermined value of restrict the rotating angle of the rotating piece at an angle of a predetermined value by stopping the driving of the air cylinders in the case of being coupled to the main body frame.

In addition, a shock absorbing apparatus is attached to the rotating piece for absorbing the shock that the stopper receives in case of being coupled to the main body frame.

Furthermore, a back-lash preventing apparatus is equipped in the main body frame, where a rack is pushed back along with the pinion that rotates according to movement of the rack.

The back-lash preventing apparatus comprises of a bracket fixed to the main body frame, and a roller hinged on the bracket and supporting tightly the backside of the rack.

Finally, a central hole is formed through which a wire passes in the center part of the pinion.

BRIEF DESCRIPTION OF THE ATTACHED DRAWINGS

DETAILED DESCRIPTION OF PREFERRED EMBODIMENT

In this preferred embodiment of the invention, a gripper that is composed of two pairs of fingers and is equipped at an angle of 90°, will be described below. In addition, a cam shaft will be named an example of a cylindrical component for illustrative purposes.

Figure 1:
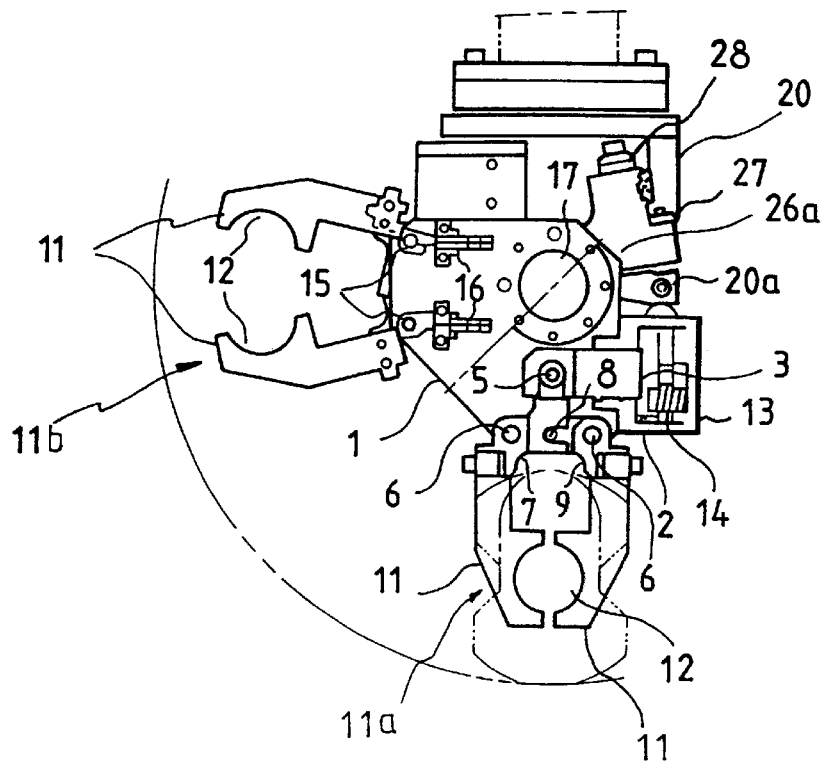
FIG. 1 is a front view of a twin gripping apparatus of the invention.
Figure 2:
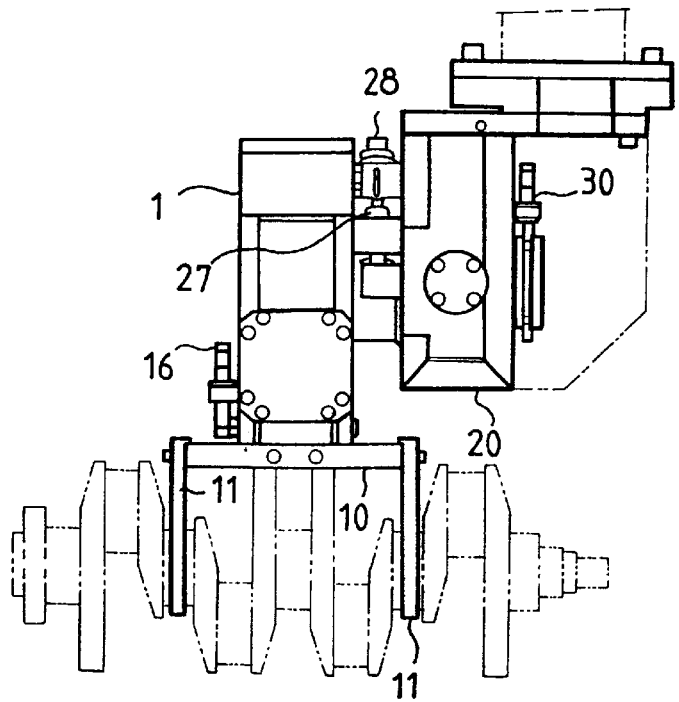
FIG. 2 is a right-side view of the twin gripping apparatus of the invention.

As illustrated in FIGS. 1 and 2, a twin gripping apparatus for loading components according to the invention such as a cylindrical component, includes a gripping apparatus for gripping the component (e.g. as a cam shaft), and a rotating apparatus for rotating the gripping apparatus by 90° forward or backward.

Figure 3:
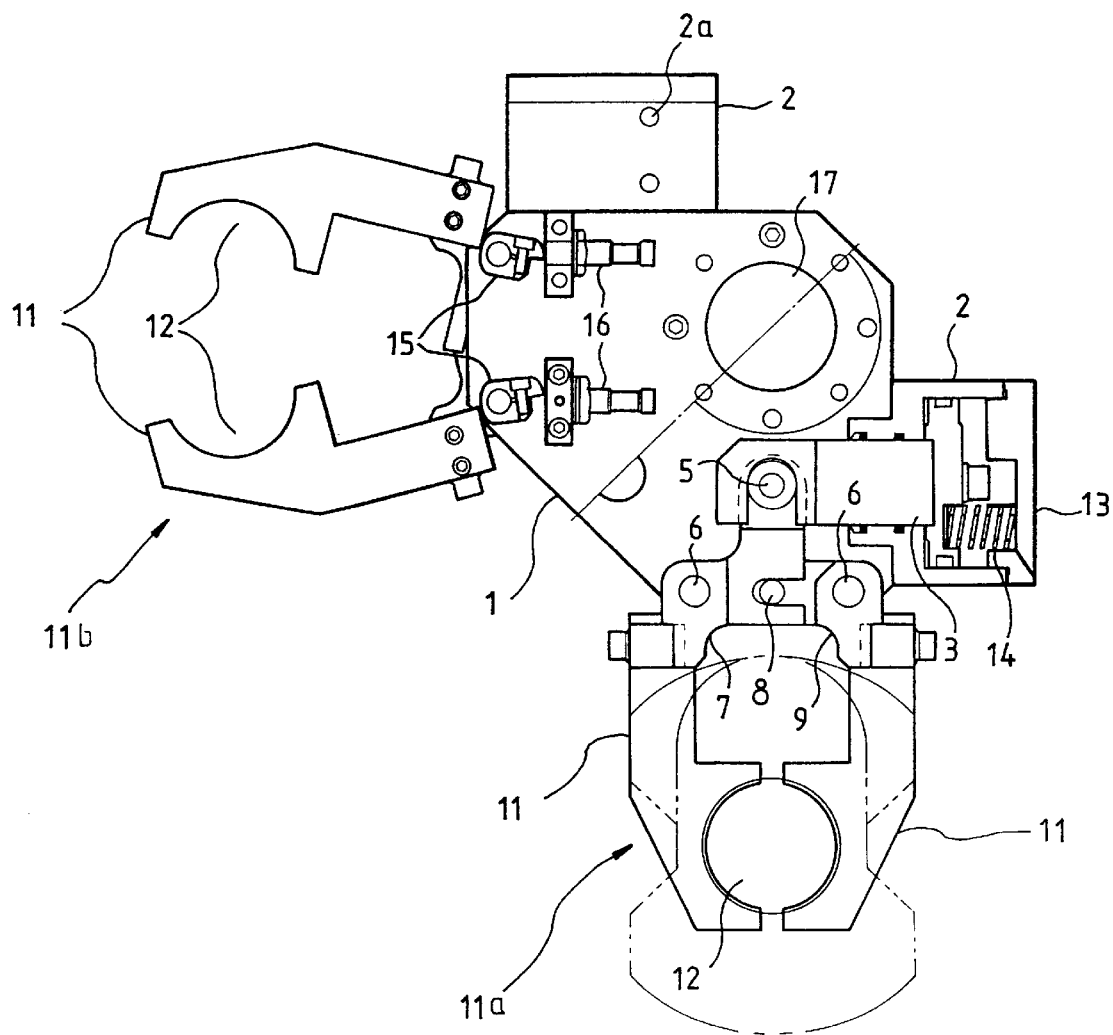
FIG. 3 is an enlarged front view of the gripping apparatus of the twin gripping apparatus according to the invention.

As illustrated in FIG. 3, the gripping air cylinders 2 are position at a right angle, to the upper and right sides of the triangle type rotating body 1. An aluminum alloy lighter than steel is used for the material of the rotating body 1. Cylinder 2 includes piston rod 3 that extends in a downward direction. The air cylinder 2 that is positioned on the upper side of the rotating body 1 of the two gripping air cylinders. Another rod 3 is mounted on the left and is connected to the gripping air cylinder 2 that is positioned on the right side of the rotating body. In addition, the first and second grippers 11a and 11b connected to each rod 3, are each composed of a pair of fingers 11 which as gripping components, and are connected by a link type connector to reciprocate relatively with each other.

Figure 4:
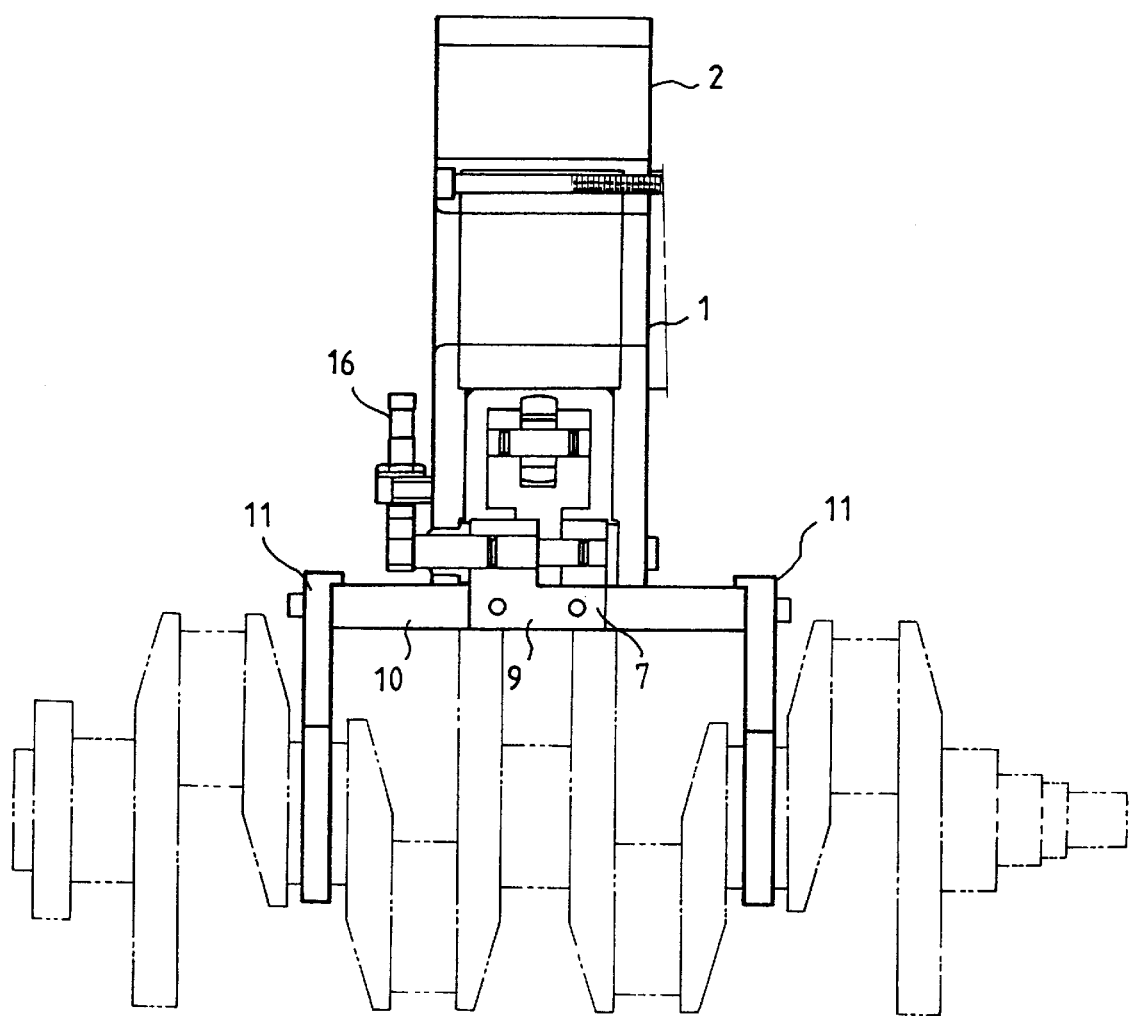
FIG. 4 is a right-side view of the gripping apparatus of the twin gripping apparatus according to the invention.

The connector for connecting the pairs of fingers 11 with the rod 3 to reciprocate with each other comprises a shifting link 5 connected to the rod 3; a first link 7 pivoted on the end of the shifting link 5 and having a center part hinged on the rotating body 1 with a hinge pin 6; a second link 9 pivoted on the center part of the first link 7 with a pivot pin 8 and hinged on the rotating body 1 with a hinge pin 6; and a pair of connection links 10 extending in a horizontal direction as illustrated in FIG. 4 and connected to each lower end of the first and second links 7 and 9 respectively.

The first and second grippers, 11a and 11b respectively, are fixed to both ends of the pair of connection links 10. The first gripper 11a a positioned on the lower end of the rotating body 1 includes a pair of fingers 11, each having a hemispheric gripping space 12 on opposing sides so that when the pair of fingers 11 meet, the gripping space 12 formed has a round shape for gripping the cam shaft.

A cap 13 is placed on the outer surface of the air cylinder 2 as illustrated in FIG. 3. Underneath the cap 13, there is provided a spring 14 for elastically supporting the rod 3 leftwards, that is, in a direction where the first gripper 11a is gripped. That is, the spring 14 has one side fixed to the back end of the rod 3 and the other side fixed to the inner wall of the cap 13. A plurality of springs 14 are positioned radially centering on the center portion of the rod 3.

Restricting end 15, selectively connected to the corresponding rotating finger 11, is attached to the rotating body 1, and a proximity switch 16 is attached to the rotating body 1 and placed near the restricting end 15, thereby sensing the operational state of the first gripper 11a. The proximity switch 16 is connected to an alarm indicating that the gripping apparatus is operational to the worker by lighting its emergency lamp.

The second gripper 11b equipped on the upper left side of the rotating body 1 is formed, connected and operated in the same manner as the first gripper 11a equipped on the lower right side of the rotating body 1.

Accordingly, the first and second grippers 11a and 11b respectively associated with each gripping air cylinder 2 are positioned perpendicular to each other.

In addition, a hole 17 through which the wire passes is formed at the center of the rotating body 1 corresponding to the intersection of the center lines of the first and second grippers 11. The wire passing through the hole 17 is connected to each hole 2a of the air cylinder 2 and the proximity switch 16. The wire is connected to a controlling part (not shown) for controlling the operation of the grippers 11a and 11b respectively, by receiving the signal of the proximity switch 16.

Figure 5:
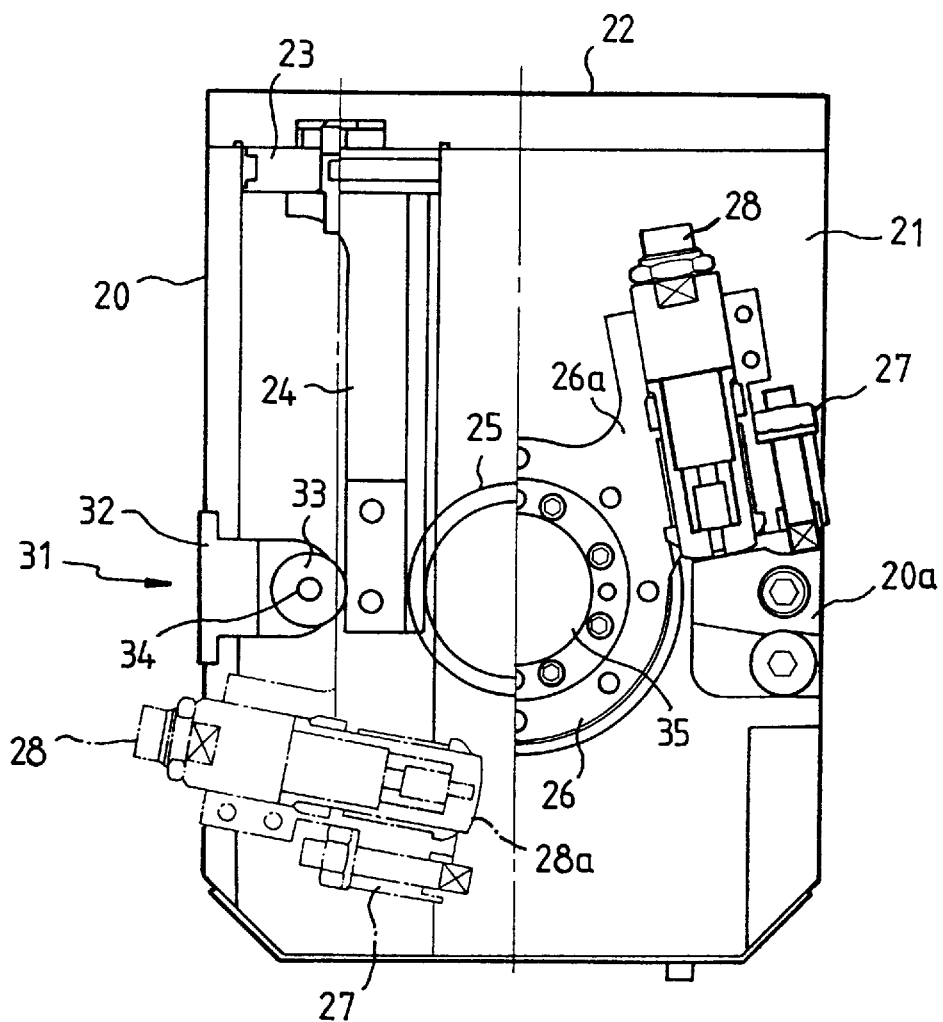
FIG. 5 is a front view of the rotating apparatus of the twin gripping apparatus according to the invention.
Figure 6:
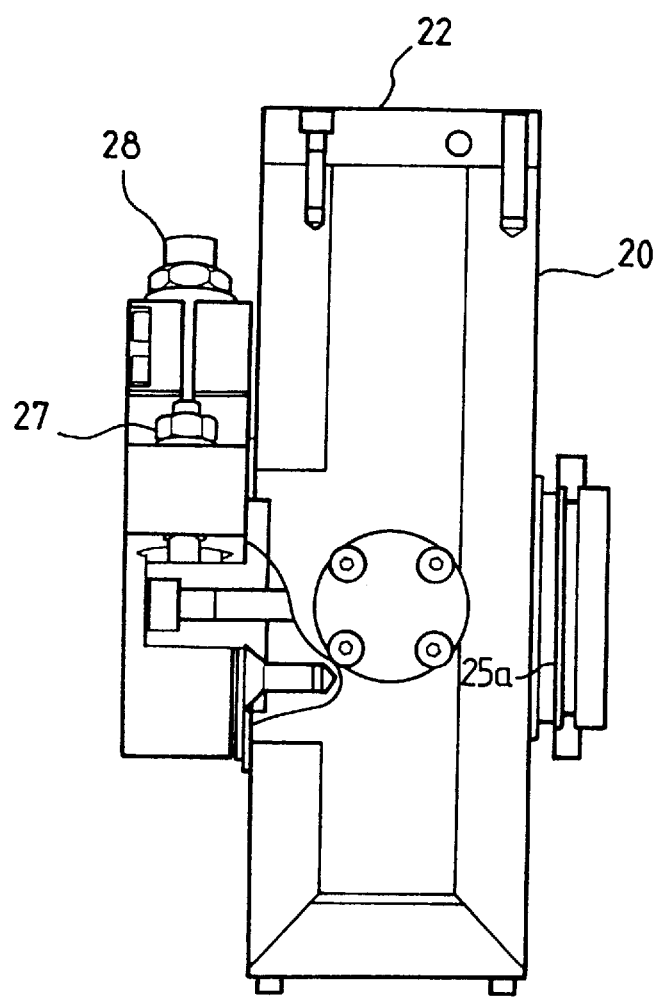
FIG. 6 is a right-side view of the rotating apparatus of the twin gripping apparatus according to the invention.
Figure 7:
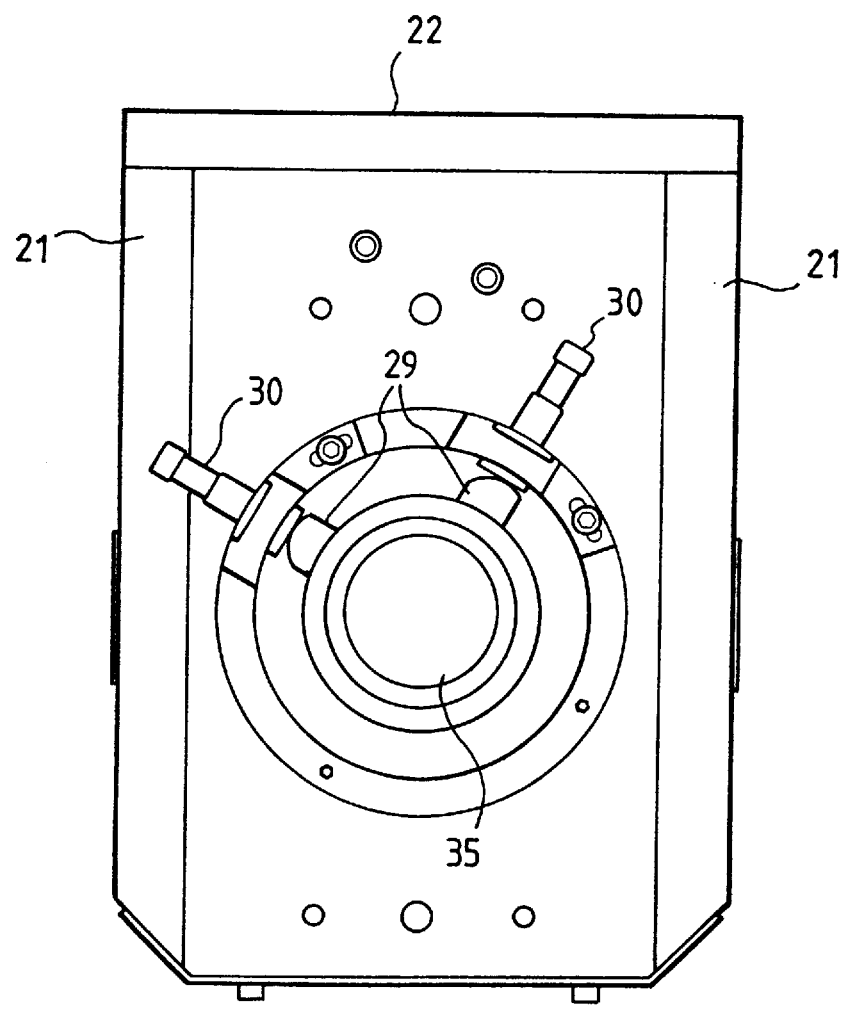
FIG. 7 is a rear view of the rotating apparatus of the twin gripping apparatus according to the invention.

As illustrated in FIG. 5, two rotating air cylinders 21 are mounted to the main body frame 20 forming a basic outer structure of the rotating apparatus. The rotating air cylinder 21 is equipped in the position of 180° on the basis of the center point of the main body frame 20 as illustrated in FIG. 7. As illustrated in FIGS. 5 and 6, a head cover 22 is attached to the upper part of the main body frame 20 to form a space therebetween at a distance. The hydraulic pressure of the air cylinder 21 is transmitted through the space between the head cover 22 and the main body frame 20. A piston 23, moving in a reciprocating motion with the hydraulic pressure of the air cylinder 21, is equipped on the lower left side of the head cover 22 as illustrated in FIG. 5. A rack 24 is equipped on the piston 23 and is of a length so that its end is extended to the center portion of the main body frame 20. At the end of the rack 24, a pinion 25 is engaged for converting the reciprocating motion of the rack 24 to a rotating motion. A rotating piece 26, that rotates with the pinion 25, is fixed on one side of the pinion 25. The rotating piece 26 is cylindrical and a protruding part 26a is formed on one part of its circumference. Two stoppers 27 are equipped to restrict the rotating angle of the pinion 25 and the rotating piece 26 by stopping the driving of the rotating air cylinder 21, so that both stoppers 27 are formed at a right angle to each other to the outer side of the protruding part 26a. A cutting part 20a, connected to the stoppers 27, is formed in the main body frame 20. In other words, the two stoppers 27 are formed at an angle of 90°, having the cutting part 20a formed between them.

A shock absorbing apparatus 28 is equipped in the protruding portion 26a of the rotating piece 26 to buffer the shock which the rotating piece 26 receives when colliding with the cutting part 20a during the rotation. The shock absorbing apparatus 28 is equipped inside the stopper 27, namely in the position near the center of the rotating piece 26. Additionally, a buffer cap 28a is put on the shock absorbing apparatus 28 connected to the cutting part 20a. The buffer cap 28a is needed to enhance the effectiveness of shock absorbing apparatus 28. Because the shock absorbing apparatus 28 moves with the rotating movement according to the rotating piece 26, the shock absorbing apparatus 28 meets the cutting part 20a at an angle and the shock is not fully absorbed. In other words, in order for the shock absorbing apparatus 28 to fully absorb the resulting shock with its collision with the cutting part 20a, the two respective contact surfaces must meet perfectly. This requires that the shock absorbing apparatus 28 should be vertically aligned with a vertical line that is formed perpendicular to the contact surface of cutting part 20a. As the shock absorbing apparatus 28 is not perfectly aligned at the instant of collision, the shock is not fully transmitted to the shock absorbing apparatus 28. With placement of the buffer cap 28a, however, absorption of the shock is improved. The buffer cap 28a first collides with the cutting part 20a and absorbs most of the shock from the collision. The force of shock is then transferred to the shock absorbing apparatus 28 having the same center line as the buffer cap 28a. As described above, the shock absorbing effect is largely improved.

On the rotating shaft 25a located to pass through the center part of the pinion 25, the rotating body of the gripping apparatus is mounted. And to the other opposing end of the rotating shaft 25a, as illustrated in FIG. 7, two restricting ends 29 are attached at right angles. Two proximity switches 30 are connected to the restricting ends 29 for sensing the rotation of rotating body 1, and are attached to the main body frame 20 at a right angle with each other.

And in this time, when the pinion 25 is shifted reciprocally according to the movement of the rack 24, a back-lash phenomenon occurs where the rack is pushed away by the rotating motion of the pinion 25 resulting in a gap, and therefore, the rack 24 and pinion 25 are prevented from smoothly rotating. A back-lash preventing apparatus 31 is attached to the center wall of the main body frame 20 in order to support the rack 24 so that it is not pushed away.

Figure 8:
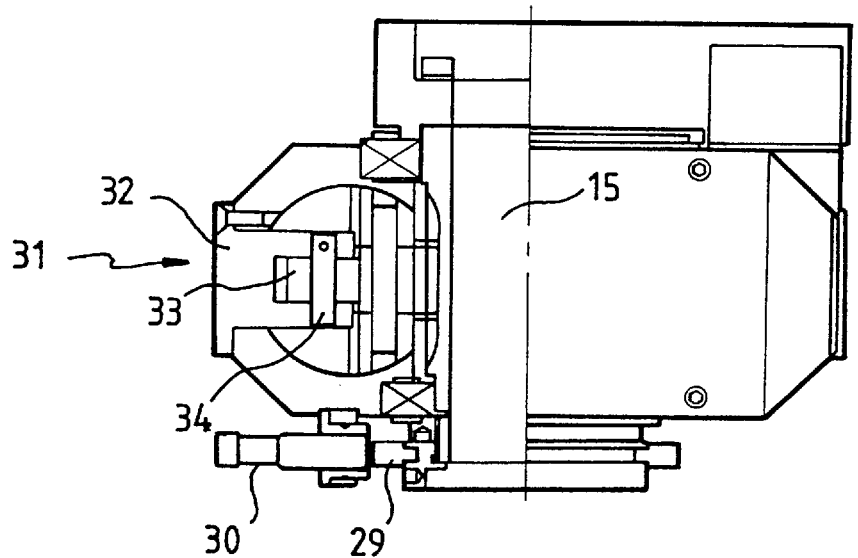
FIG. 8 is a bottom view of the rotating apparatus of the twin gripping apparatus according to the invention.

The back-lash preventing apparatus 31, as illustrated in FIGS. 5 and 8, comprises a bracket 32 that is fixed at the center wall of the main body frame 20 and has a pin hole; a roller 33 that is connected to the bracket 32 and supports the back side of the rack 24; and a hinge pin 34 that is inserted into the pin holes of the roller 33 and the bracket 32. During the reciprocating motion of the rack 24, the rack 24 is supported by the outer circumference of the roller 33 enabling free rotation so that the rack 24 is not pushed away.

As illustrated in FIGS. 5 and 7, a hole 35, through which the wire passes, is formed at the center part of the pinion 25 to electrically connect the rotating air cylinder 21 to the proximity switch 30 which is in turn, connected to the control part.

The operation of the invention is now described below.

The first and second grippers, 11a and 11b, are identical in composition and structure. Therefore, the gripping action described for the second gripper 11b will use the same figure references as the first gripper 11a.

First, the unfinished cam shaft is gripped by the second gripper 11b while the first gripper 11a is empty. In this state, when the gripping air cylinder 2 that is positioned on the upper side of the rotating body 1 is in operation, the rod 3 is shifted to right. Thereafter, the upper sides of the shifting link 5 and the first link 7 are also shifted to right. While as its center is hinged with the hinge pin 6 on the rotating body 1, the finger attached to link 7 is shifted to left. While the upper side of the second link 9 connected to the first link 7 through means of the pivot pin 8 moves downward in conjunction with the downward movement pin 8, and a result, the finger attached to link 9 side shifts to right. Accordingly, through the connection link 10, the pairs of the fingers 11 are thus spread apart away from each other. In order to grip the processed cam shaft, the air cylinder 2 is driven in the opposite direction, thereby shifting the rod 3 to left. In reverse to the above case, the shifting link 5 is shifted to left. Therefore the respective fingers attached to the first and second links, 7 and 8, move inwardly together. Accordingly, as the pairs of fingers 11 close, the inner sides of the pairs of fingers 11 meet each other, thereby gripping the cam shaft. At this time, because the spring 14 already elastically supports the rod 3 to a leftward direction, the gripping force of the second gripper 11b is reinforced by adding the elasticity of the spring 14 to the hydraulic pressure from the gripping air cylinder 2. Even if there is a loss of hydraulic pressure due to trouble with the air cylinder 2, the pair of fingers 11 do not automatically open because of the continuous and elastic support to the rod 3 from the spring 14. Accordingly, any damage to the cam shaft and injury to the workers from the sudden release of the cam shaft is prevented with this embodiment of the invention.

After the finished cam shaft is gripped by the first gripper 11a, the rotating air cylinder 21 is operated. The hydraulic pressure supplied from the rotating air cylinder 21 shifts the piston 23 by means of head cover 22. The piston 23 then correspondingly shifts the rack 24 in the same direction. The pinion 25 engaged in the rack 24 and the rotating piece 26 are then rotated and the rectilinear motion of the rack 24 is converted into the reciprocating motion. Therefore, the rotating body 1, of the gripping apparatus equipped on the rotating shaft 25a of the pinion 25, is rotated. When the restricting end 29 makes contact with the proximity switch 30 which sensing the contact, the proximity switch displays that the gripping apparatus is operational though the activation of an alarm sound or an emergency lamp. If the rotating angle of the rotating piece 26 reaches to 90°, the stopper 27 makes contact with the cutting part 20a of the main body frame 20. Thereafter, a signal is transmitted through the wire to the control end. The control end, receiving the signal, stops the rotating air cylinder 21. The restricting end 29 then comes into contact with the other proximity switch 30 and the emergency lamp or the alarm sound is deactivated according to the sensing by the proximity switch 30.

A shock absorbing apparatus 28 is equipped in the protruding portion 26a of the rotating piece 26 to buffer the shock which the rotating piece 26 receives when colliding with the cutting part 20a during the rotation. Because the shock absorbing apparatus 28 moves with the rotating movement according the rotating piece 26, the shock absorbing apparatus 28 meets the cutting part 20a at a slope and the shock is not fully absorbed. In other words, in order for the shock absorbing apparatus 28 to fully absorb the resulting shock with it collision with the cutting part 20a, the two respective contact surface must meet perfectly requiring that the shock absorbing apparatus 28 should be vertically aligned with a vertical line that is perpendicular to the contact surface of cutting part 20a. As the shock absorbing apparatus 28 is not perfectly aligned at the instant of collision, the shock is not fully transmitted to the shock absorbing apparatus 28. With placement of the buffer cap 28a, however, absorption of the shock is improved. The buffer cap 28a first collides with the cutting part 20a and absorbs most of the shock from the collision. The force of shock is then transferred to the shock absorbing apparatus 28 having the same center line as the buffer cap 28a. As described above, the shock absorbing effect is largely improved.

Because the air cylinder 21, supplying the hydraulic pressure enabling this kind of rotating operation, is arranged symmetrically at an angle of 180°, the same torque may be transmitted to the piston 23 in the two cases of forward and reverse rotation of the rotating body 1. Accordingly, the rotating body 1 can be rotated at a correct angle.

The manufactured cam shaft is carried from the work station simultaneously with the non-processed cam shaft carried to the work station by repeatedly rotating the first and second grippers, 11a and 11b respectively, at an angle of 90° in a forward/reverse directions.

When this kind of rotating operation is repeatedly performed, however, a back-lash occurs where the rack 24 is pushed away back from pinion 25 from the rotating motion of pinion 25. As the rack 24 is moved away from the pinion 25 only performing a reciprocating motion at a fixed position, and is no longer correctly engaged with the pinion 25. The constant movement of position towards and away from pinion 25, results in a generation of serious vibrations during the rotation of pinion 25. This vibration is amplified and transmitted to the gripping apparatus and keeps the gripping apparatus from properly gripping the cam shaft. Therefore, in the invention, the back-lash preventing apparatus 31 is provided to prevent the back-lash phenomenon. When the rack 24 is shifted according to the shift of the piston 23, the back side of the rack 24 is supported by the roller 33, so that the rack 24 is pushed back. As the roller 33 is connected to the bracket 32 to be rotated according to the shifting direction of the rack 24, the roller 33 can tightly support the rack 24 without hindering the rectilinear motion of the rack 24.

The present invention reinforces the gripping force of the gripper by providing the spring for elastically supporting the rod of the air cylinder. Even if there is a loss of hydraulic pressure, because the spring, continually and elastically, supports the rod, the cam shaft is not released. Accordingly, damage to the cam shaft or serious injury the workers, due to the sudden release of the cam shaft, can be thus prevented in the invention.

The vertical length of entire gripping apparatus is reduced by equipping the gripping air cylinder to be at a right angle with the center line of the gripper to the rotating body. The gripping apparatus can load the components at the high position, thereby preventing accidents that occur from collision with the workers or other equipment. Additionally, the invention has an effect that a sufficient equipping space can be more easily provided with the reduced vertical length of the gripping apparatus.

The invention can largely reduces the weight by providing the rotating body of the gripping apparatus with an aluminum alloy. Accordingly, the air cylinder having a high capacitance is not needed.

In addition, the invention prevents the wire from being tangled and disconnected when the twin gripper rotates in forward & reverse directions by forming the hole through which the wire passes, at the center part of the pinion of the rotating apparatus and the rotating body of the gripping apparatus.

In the above-mentioned preferred embodiment of the invention, though the first and second grippers, 11a and 11b, are described as perpendicular or 90° with respect to each other, it can also be the case that the first and second grippers, 11a and 11b, are positioned at an angle of predetermined value can be 180° with respect to each other. If the first and second grippers, 11a and 11b, are equipped at an angle of 180° to the rotating body, the stoppers 7 should be correspondingly positioned at an angle of 180° to the rotating piece enabling the rotation of the first and second grippers to an angle 180° in the forward and backward directions. The twin gripping apparatus using an angle of 180° performs the same functions as the twin gripping apparatus using an angle of 90°, thereby having the same effect.

In an embodiment of the invention, though a cam shaft has been described, the twin gripping apparatus can be applied in the case of loading any other cylindrically shaped components which can be gripped in the gripping space forming by the pair of fingers.

What is claimed:

1. A twin gripping apparatus for loading components, comprising:

a rotating body;

a pair of gripping air cylinders mounted to the rotating body, each cylinder including a rod having an axis extending at a predetermined angle to the axis of the other rod;

first and second grippers each including a pair of fingers connected to an associated rod of one of said gripping air cylinders, said grippers being adapted to grip the components under the action of said gripping air cylinders;

a spring mounted between a back end of each said air cylinder and said rotating body, said spring biasing the gripping fingers into a gripping position;

connection means for connecting one said pair of fingers to the associated rod of one said air cylinder to move said fingers between a closed gripping position and an opened position;

a rotating member supporting said rotating body for rotation in opposite directions through predetermined rotational intervals by an angle of predetermined value; and wherein a plurality of said springs are mounted in centered relationship with each other in the back end of each said air cylinder.

2. The twin gripping apparatus for loading components as defined in claim 1, wherein said rotating apparatus comprises:

a main body frame;

two rotating air cylinders symmetrically arranged on a center line of said main body frame;

a piston reciprocally moving by hydraulic pressure transferred from said rotating air cylinder;

a rack having relative reciprocated motion, said rack connected to said piston;

a pinion coupled to said rack, said pinion having said rotating body;

a rotating piece fixed to and rotated with said pinion; and two stoppers attached to said rotating piece to have an angle of predetermined value therewith, said two stoppers stopping said air cylinder when coming into said main body frame, thereby restricting the rotating angle of said rotating piece by an angle of predetermined value.

3. The twin gripping apparatus for loading components as defined in claim 2, wherein a shock absorbing device is attached to said rotating piece to absorb impacts that a stop receives when making contact with said main body frame.

4. The twin gripping apparatus for loading components as defined in claim 3, wherein a buffer cap is put on said shock absorbing device making contact with said main body frame.

5. The twin gripping apparatus for loading components as defined in claim 2, wherein said main body frame comprises a back-lash preventing device for preventing said rack from being pushed away from said pinion while said pinion is shifted together with said rack.

6. The twin gripping apparatus for loading components as defined in claim 5, wherein said back-lash preventing device, comprises:

a bracket fixed to said main body frame; and a roller hinged on said bracket, said roller tightly supporting the back of said rack.

7. The twin gripping apparatus for loading components as defined in claim 2, wherein a hole through which wire passes is formed on the center of said rotating body.

8. The twin gripping apparatus for loading components as defined in claim 1, wherein said gripping air cylinders extend at an angle of 90° to each other.

9. The twin gripping apparatus for loading components as defined in claim 1, wherein said gripping air cylinders extend perpendicular to a line connecting the centers of said rotating body and said gripper.

10. The twin gripping apparatus for loading components as defined in claim 1, wherein a hole through which electrical connection wire passes is formed in a center portion of said rotating body.

11. The twin gripping apparatus for loading components as defined in claim 1, wherein said rotating body is made of an aluminum alloy.

12. The twin gripping apparatus for loading components as defined in claim 1, wherein said connection means includes:

a shifting link connected to said gripping air cylinders;

a first link pivotally connected to said shifting link, said first link having a center portion hinged on said rotating body;

a second link pivotally connected to said center portion of said first link, said second link including a center portion hinged on said rotating body; and a connection link fixed on each of lower ends of said first and second links, said first and second links connected to both ends of said connection link.

13. The twin gripping apparatus for loading components as defined in claim 1, wherein said rotating body comprises:

a restricting end attached to the upper portion of said finger; and a proximity switch for controlling the operation of said finger, said switch being contactable with said restricting end and attached to said rotating body.

* * * * *